(12) United States Patent
Lloyd

(10) Patent No.: US 6,270,086 B1
(45) Date of Patent: Aug. 7, 2001

(54) COLLET ACTUATOR FOR TOOL HOLDER

(76) Inventor: Don R. Lloyd, 802 F. Harbortown, Noblesville, IN (US) 46060

( * ) Notice: Subject to any disclaimer, the term of this patent is extended or adjusted under 35 U.S.C. 154(b) by 0 days.

(21) Appl. No.: 09/374,195

(22) Filed: Aug. 13, 1999

Related U.S. Application Data
(60) Provisional application No. 60/096,428, filed on Aug. 13, 1998.

(51) Int. Cl.[7] ....................................................... B23B 31/20
(52) U.S. Cl. .............................. 279/51; 279/46.3; 279/53; 409/234
(58) Field of Search ................................ 279/51, 53, 103, 279/156, 43.2, 46.3; 409/232, 234

(56) References Cited

U.S. PATENT DOCUMENTS

| | | | |
|---|---|---|---|
| 896,663 | * 8/1908 | Rahm | 279/53 |
| 1,370,598 | * 3/1921 | Lapointe | 279/53 |
| 1,463,176 | * 7/1923 | Schieldge | 279/53 |
| 1,489,976 | * 4/1924 | Brown | 279/51 |
| 2,880,007 | * 3/1959 | Stoner | 279/53 |
| 3,030,119 | * 4/1962 | Myers | 279/53 |
| 3,353,833 | 11/1967 | Marini, Sr. . | |
| 3,701,537 | 10/1972 | Rossman et al. . | |
| 3,719,367 | * 3/1973 | Baturka | 279/156 |
| 4,226,562 | 10/1980 | Schmid et al. . | |
| 4,396,320 | 8/1983 | Bellmann et al. . | |
| 4,451,185 | 5/1984 | Yamakage . | |
| 4,573,824 | * 3/1986 | Ehle | 409/234 |
| 4,575,293 | * 3/1986 | Berti | 409/234 |
| 4,642,005 | 2/1987 | Kondo et al. . | |
| 4,643,623 | 2/1987 | Kondo et al. . | |
| 4,710,079 | 12/1987 | Smith et al. . | |
| 4,722,645 | 2/1988 | Regan . | |
| 4,747,735 | 5/1988 | Erickson et al. . | |
| 4,834,596 | 5/1989 | Hollifield et al. . | |
| 4,938,490 | * 7/1990 | Bosek | 279/51 |
| 5,372,465 | 12/1994 | Smith . | |
| 5,593,258 | 1/1997 | Matsumoto et al. . | |
| 5,613,692 | 3/1997 | Lloyd . | |
| 5,622,373 | * 4/1997 | Tagami | 279/53 |
| 5,957,467 | * 9/1999 | Hornung | 279/51 |

FOREIGN PATENT DOCUMENTS

| | | | |
|---|---|---|---|
| 3406490A1 | 8/1985 | (DE) . | |
| 683981 | * 12/1952 | (GB) | 279/51 |
| 2171037A | 8/1986 | (GB) . | |

OTHER PUBLICATIONS

"On HSK", by Gary S. Vasilash, *Production*, Feb. 1995.
"Management Update", "Making a good idea HSK, Even Better", *Tooling & Production*, Dec. 1995.
"BT and V–Flange CNC Toolholder Systems", *Command*, Jun. 1995.
Chapter 9, "Toolholders for Drilling", Date Unknown.

* cited by examiner

Primary Examiner—Steven C. Bishop
(74) Attorney, Agent, or Firm—Barnes & Thornburg

(57) ABSTRACT

A tool holder includes a body, a collet, and a collet mover. The body is formed to include a collet chamber and a collet-mover chamber arranged to communicate wit the collet chamber. The collet includes a tool-gripping surface arranged to define a tool-receiving chamber adapted to receive a machine tool therein. The collet is mounted for movement in the collet chamber along a central axis of the body between a tool-grip position to cause the tool-gripping surface to move radially inwardly toward the central axis to grip the machine tool in the tool-receiving chamber and a tool-release position to cause the tool-gripping surface to move radially outwardly away from the central axis to release the machine tool. The collet mover is positioned to lie in the collet-mover chamber and is coupled to the collet to draw the collet along the central axis to the tool-grip position.

56 Claims, 10 Drawing Sheets

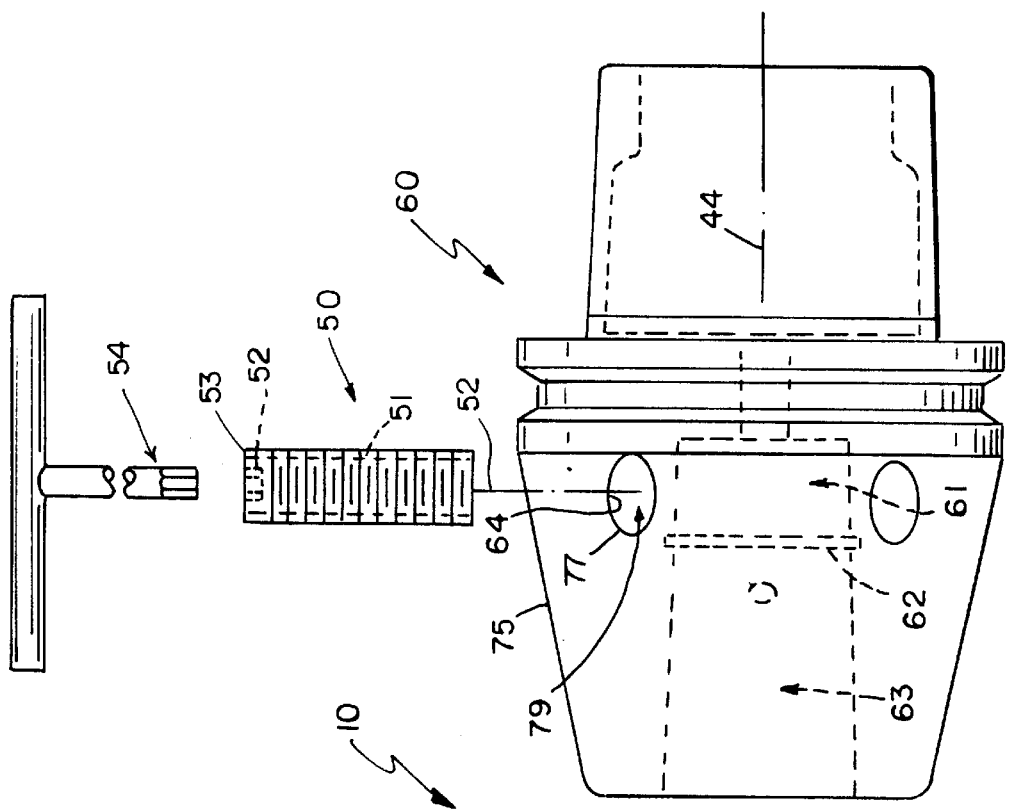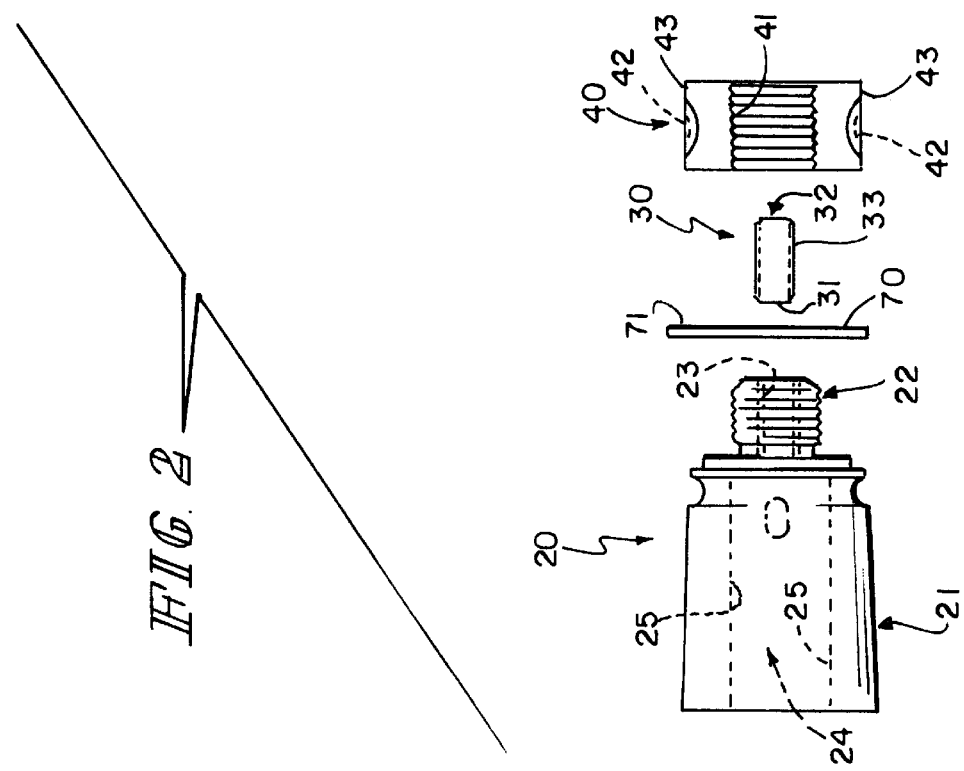
FIG. 2

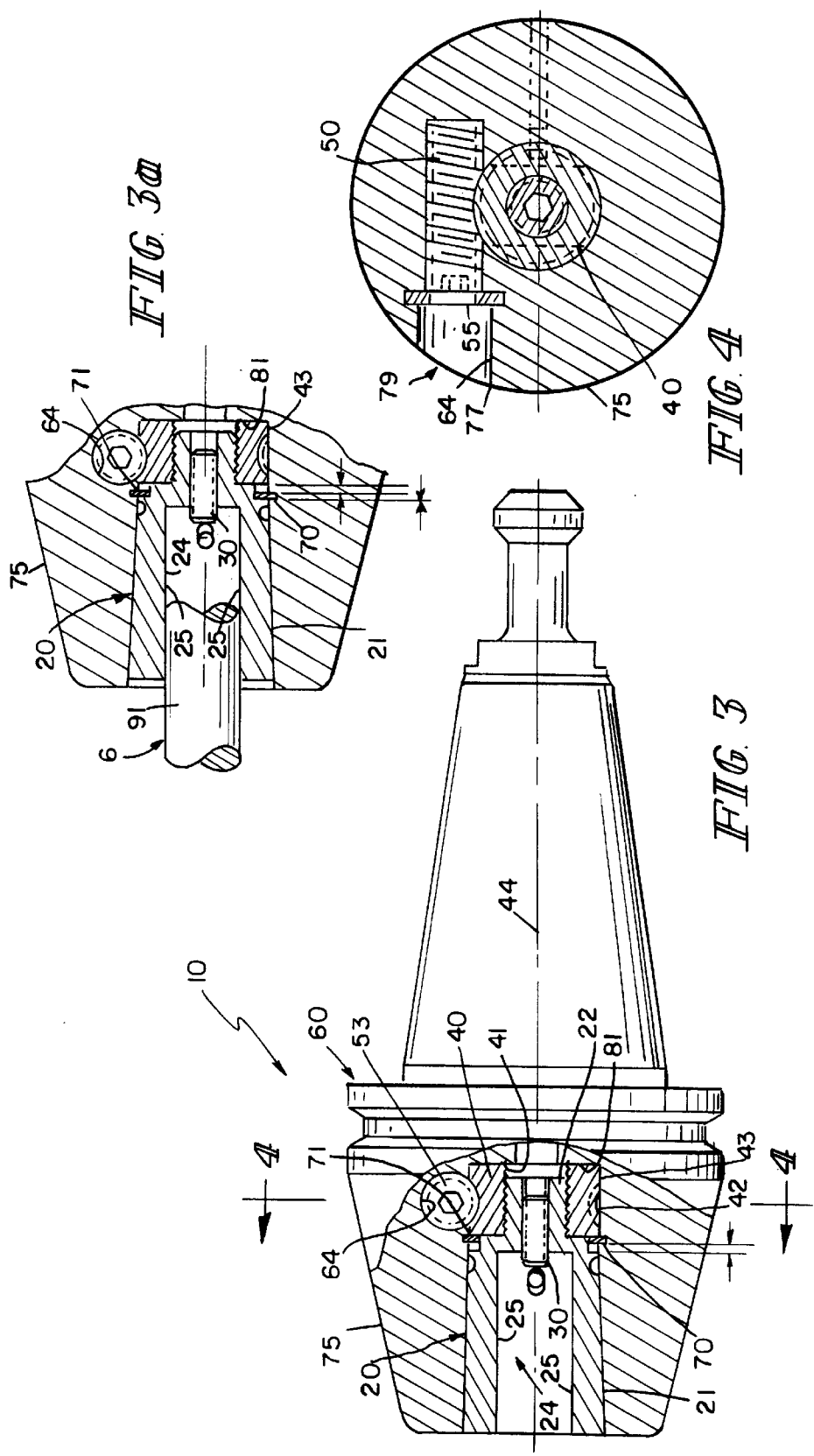

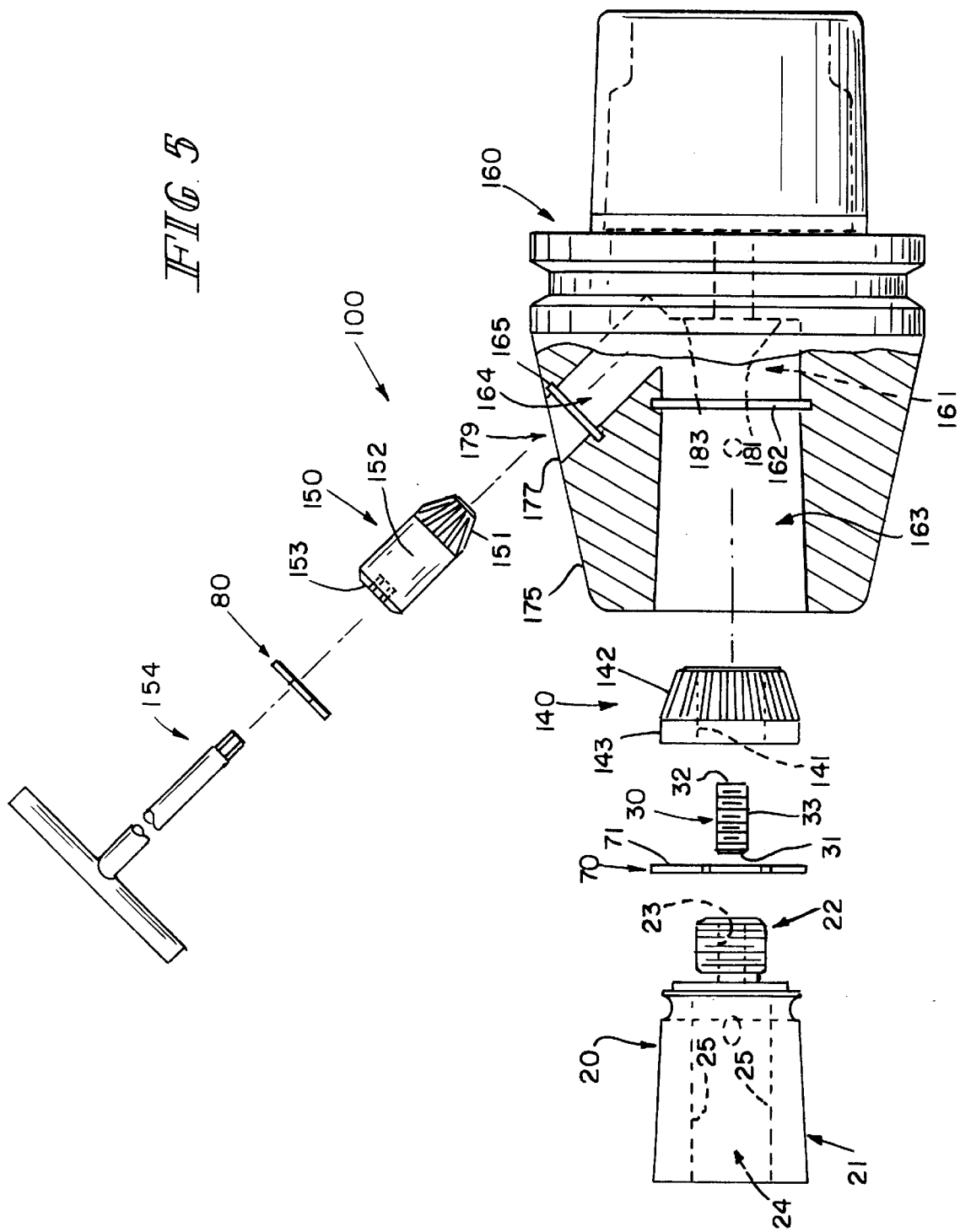

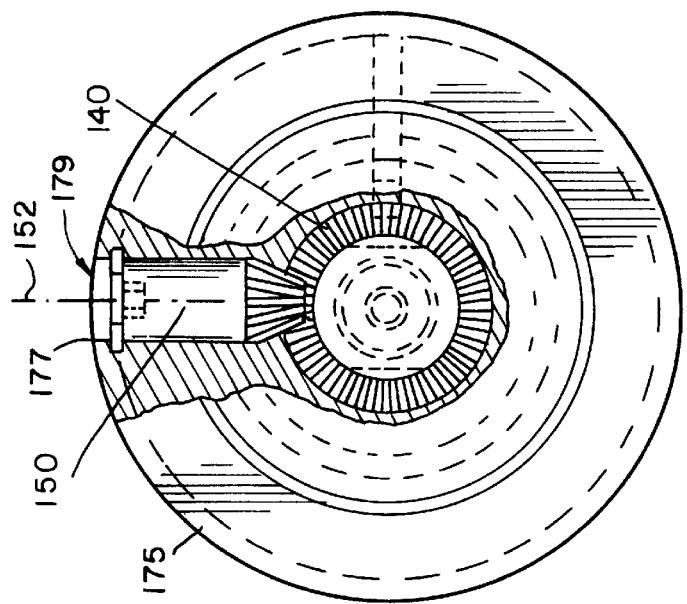
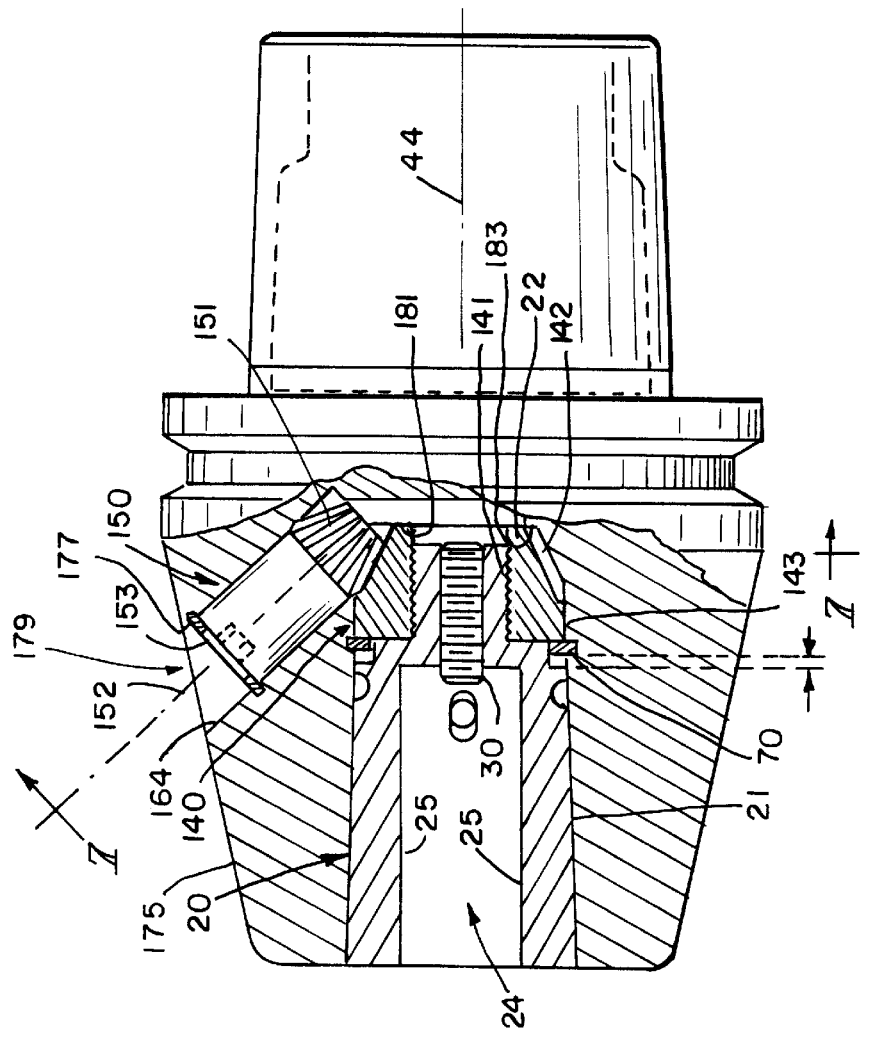

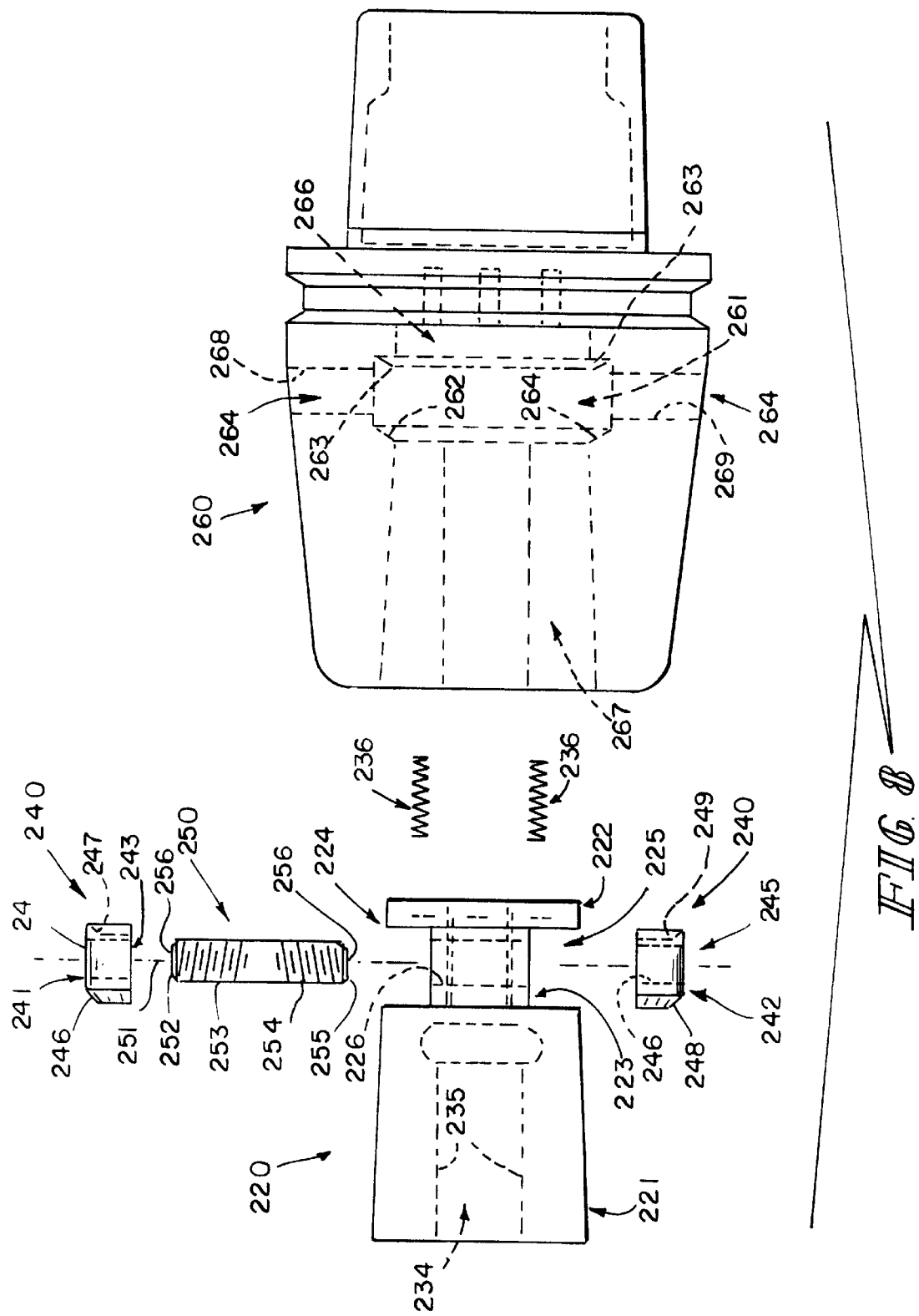

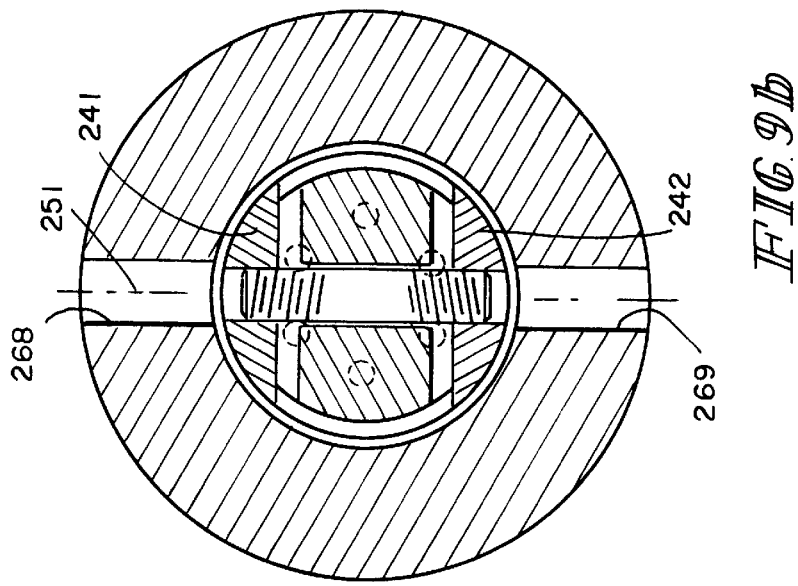
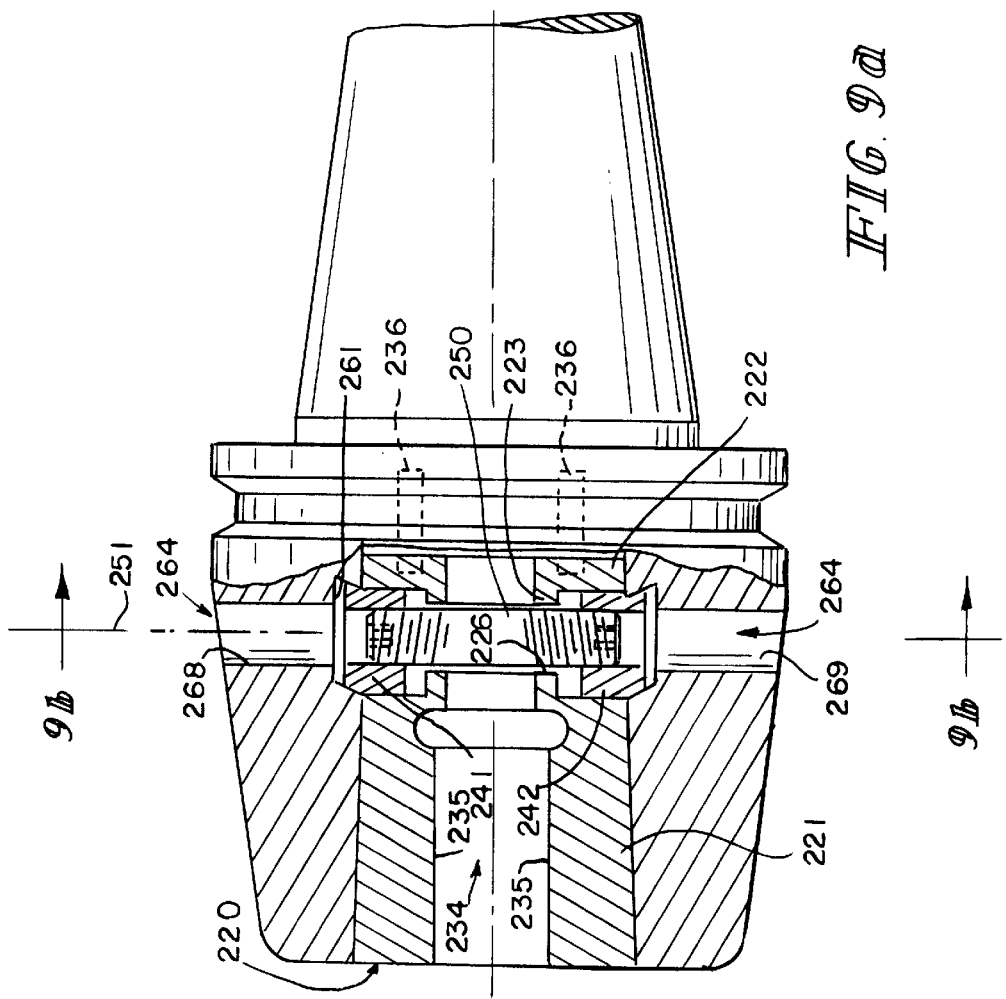
FIG. 9b
FIG. 9a

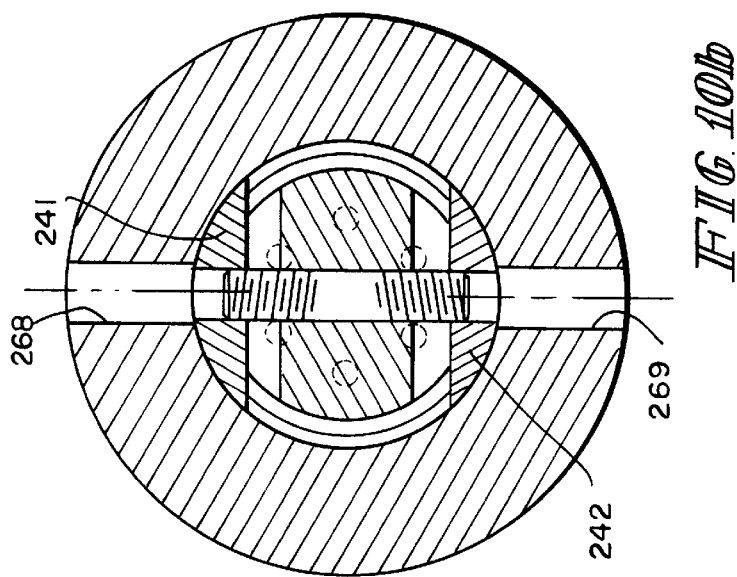
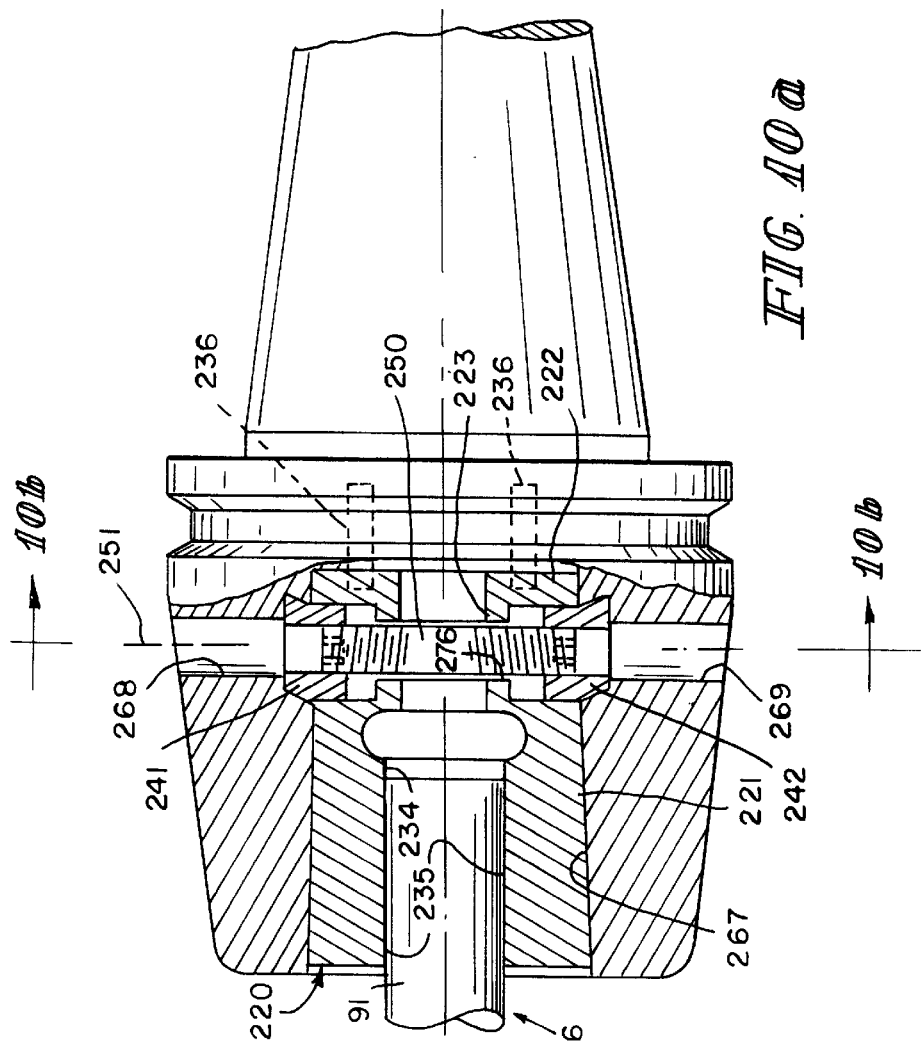

COLLET ACTUATOR FOR TOOL HOLDER

This application claims priority under U.S.C. § 119 (e) to U.S. Provisional application Ser. No. 60/096,428, filed Aug. 13, 1998, which is expressly incorporated by reference herein.

BACKGROUND AND SUMMARY OF THE INVENTION

The present invention relates to a tool holder, and particularly to a tool holder for a high-precision machining center. More particularly, the present invention relates to a collet actuator for use in a tool holder.

Tool holders are typically used to mount machine tools such are drills, reamers, or grinders to a drill press, machining center, or other machining device. A spindle on the machining device spins the tool holder and the machine tool mounted thereon relative to a workpiece to drill, ream, grid, or otherwise machine the work piece into a desired shape.

Some tool holder are configured to be removed easily from the machining device to facilitate tool holder replacement and quick change-over between machine tool types or sizes, or to replace worn machine tools. Typically, a machine tool is first gripped by the tool holder and then the tool holder itself is mounted to the machining device.

According to the present invention, a tool holder includes a body formed to include a collet chamber and a collet-mover chamber, a coilet mounted for movement in the collet chamber, and a collet mover positioned to lie in the collet-mover chamber and coupled to the collet to move the collet relative to the body. The collet includes a tool-gripping surface arranged to define a tool-receiving chamber adapted to receive a machine tool therein.

The collet moves along a central axis of the body between a tool-grip position to cause the tool-gripping surface to move radially inwardly toward the central axis to grip the machine tool in the tool-receiving chamber and a tool-release position to cause the tool-gripping surface to move radially outwardly away from the central axis to release the machine tool. The collet mover draws the collet along the central axis to the tool-grip position in response to rotation of the collet mover about an axis of rotation in the collet-mover chamber and pushes the collet along the central axis to the tool-release position in response to rotation of the collet mover about an axis of rotation in the collet-mover chamber.

In preferred embodiments, the body is formed to include a passageway and includes an exterior surface having an edge that defines an access aperture opening into the passageway. The tool holder further includes a driver positioned in the passageway to engage the collet mover to move the collet relative to the body to cause the tool-gripping surface of the collet to engage the machine tool. The access aperture provides access to the driver while the tool holder is mounted on a machining center so that an operator may use a small handle tool, e.g. an alien wrench, to rotate the driver in the passageway and thereby move the collet relative to the body to cause the collet to grip the machine tool while the tool holder remains mounted to the machining center. Therefore, removal of the tool holder from the machining center prior to removal of the machine tool from the tool holder is unnecessary.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 2 is an exploded assembly view of a tool holder in accordance with a first preferred embodiment of the present invention showing the tool holder including a body, a tool holder-change flange coupled to the body, a collet aligned for positioning in the body, a collet actuator including a cylindrical worm gear and a worm, and a T-shaped drive tool positioned to engage and rotate the worm;

FIG. 3 is a side elevation view of the tool holder of FIG. 2, with portions broken away, showing the worm engaging the worm gear to rotate the worm gear in response to rotation of the drive tool and the worm gear engaging the collet to draw the collet into engagement with the body in response to rotation of the worm gear;

FIG. 3a is a view similar to a portion of FIG. 3 showing movement of the collet to the right to grip a machine tool received therein in response to rotation of the drive tool, worm, and worm gear;

FIG. 4 is a transverse sectional view taken along line 4—4 of FIG. 3 showing the worm engaging the worm gear;

FIG. 5 is an exploded assembly view of a tool holder in accordance with a second preferred embodiment of the present invention showing the tool holder including a body, a tool holder-change flange coupled to the body, a collet aligned for positioning in the body, a collet actuator including a driven bevel gear and a drive bevel gear, and a T-shaped drive tool positioned to engage and rotate the drive bevel gear;

FIG. 6 is a side elevation view of the tool holder of FIG. 5, with portions broken away, showing the drive bevel gear engaging the driven bevel gear to rotate the drive bevel gear in response to rotation of the drive tool and the driven bevel gear engaging the collet to draw the collet into engagement with the body in response to rotation of the driven bevel gear;

FIG. 7 is a transverse sectional view taken along line 7—7 of FIG. 6 showing the drive bevel gear engaging the driven bevel gear;

FIG. 8 is an exploded assembly view of a tool holder in accordance with a third preferred embodiment of the present invention showing the tool holder including a body, a tool holder-change flange coupled to the body, a collet aligned for positioning in the body, and a collet actuator including a pair of wedges and a differential screw;

FIG. 9a is a side elevation view of the tool holder of FIG. 8, with portions broken away, showing the differential screw engaging the wedges to push the wedges apart in response to rotation of the drive tool and the wedges engaging cam surfaces on the body to draw the collet into engagement with the body in response to separation of the wedges;

FIG. 9b is a transverse sectional view taken along line 9b—9b of FIG. 9a showing the differential screw engaging the wedges;

FIG. 10a is a view similar to FIG. 9a showing radially outward movement of the wedges to draw the collet further to the right to grip a machine tool received therein;

FIG. 10b is a transverse sectional view taken along line 10b—10b of FIG. 10a showing the differential screw moving the wedges radially outward;

DETAILED DESCRIPTION OF THE DRAWINGS

Figure 1:
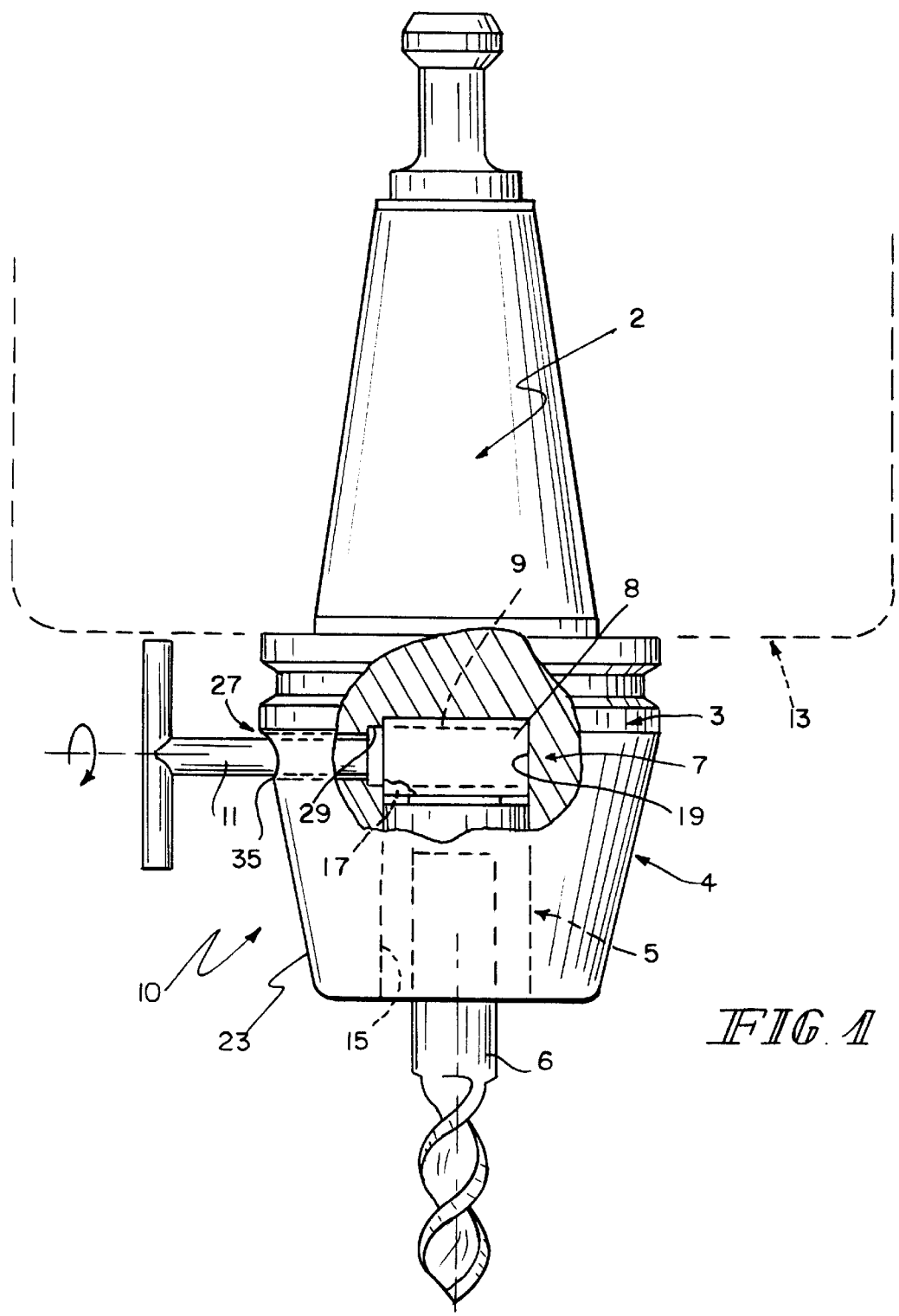
FIG. 1 is a side elevation view of a tool holder, with portions broken away, gripping a machine tool and showing the tool holder including a conical shank positioned to lie in a spindle (shown in phantom), a body positioned to lie outside of the spindle, a collet positioned to lie in the body to grip the machine tool, a collet actuator positioned to lie in the body to move the collet relative to the body to grip the machine tool, a tool holder-change flange positioned to interconnect the conical shank and the body, and a drive tool positioned to extend into the body at a position "below" the tool holder-change flange to engage and operate the collet actuator to cause the movement of the collet relative to the body to either grip or release the machine tool.
Figure 11:
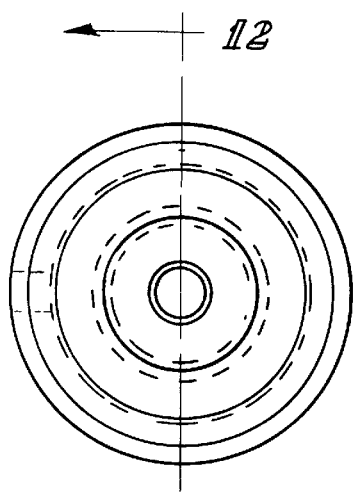
FIG. 11 is an end view of a collet suitable for use in the tool holder shown in FIGS. 2 and 5.
Figure 12:
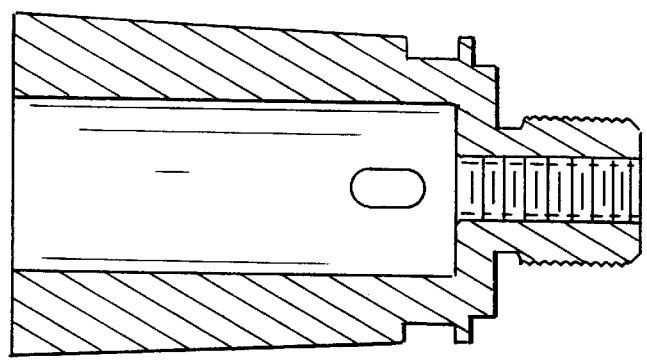
FIG. 12 is a section of the tool holder taken along line 12—12 of FIG. 11.
Figure 13:
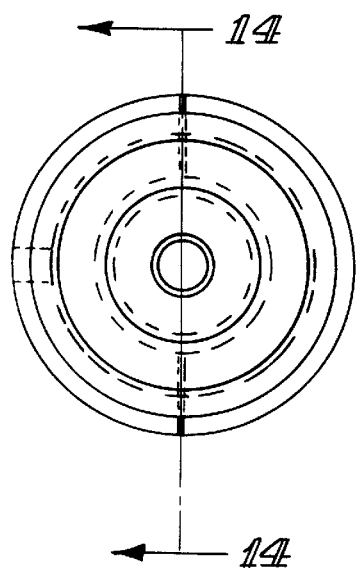
FIG. 13 is an end view of a second embodiment of a collet that is suitable for use in the tool holder of FIGS. 2 and 5.
Figure 14:
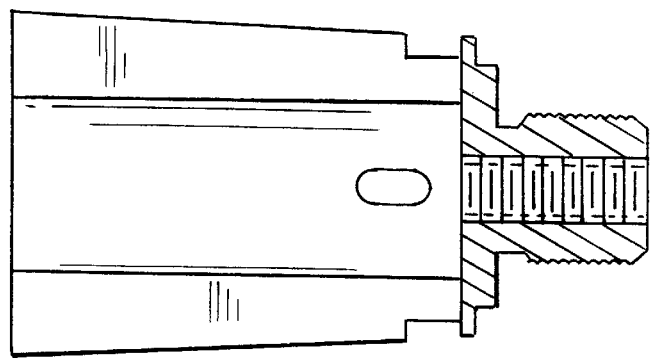
FIG. 14 is a sectional view of the tool holder taken along line 14—14 of FIG. 13.
Figure 15:
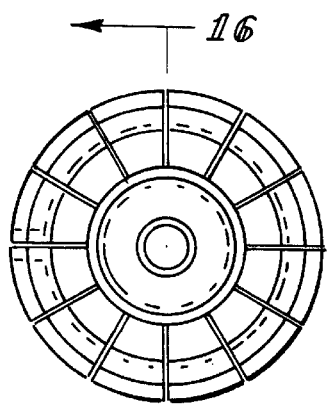
FIG. 15 is an end view of a third embodiment of a collet that is suitable for use in the tool holder of FIGS. 2 and 5.
Figure 16:
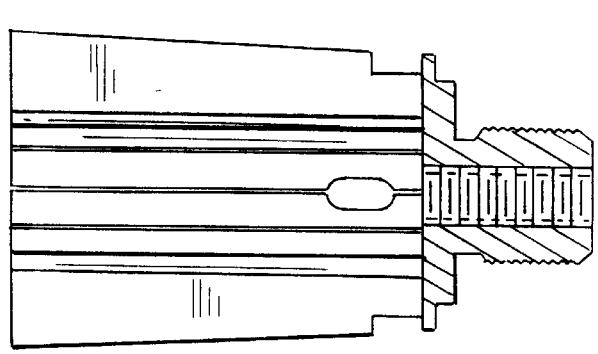
FIG. 16 is a sectional view of the tool holder taken along line 16—16 of FIG. 15.
Figure 17:
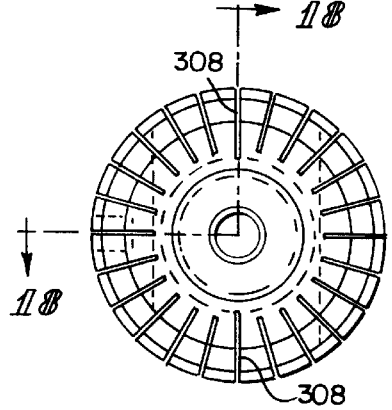
FIG. 17 is an end view of a fourth embodiment of a collet that is suitable for use in the tool holder of FIGS. 2 and 5.
Figure 18:
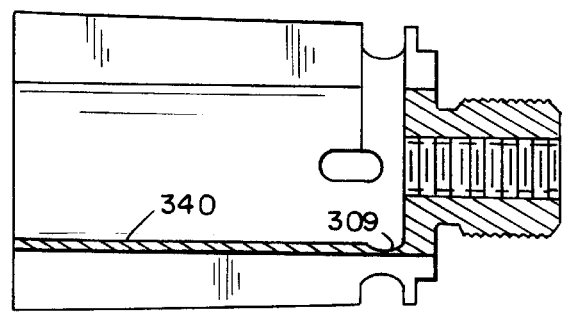
FIG. 18 is a sectional view of the tool holder taken along line 18—18 of FIG. 17.

A tool holder 1 according to the present invention is shown in FIG. 1. Tool holder 1 includes a conical shank 2, a tool holder-change flange 3 coupled to conical shank 2, a body 4 coupled to tool holder-change flange 3, a collet 5 positioned to lie in body 4 to grip a machine tool 6, and a collet actuator 7 positioned to lie in body 4 to move collet 5 relative to body 4 to cause collet 5 to grip machine tool 6.

Collet actuator 7 includes a collet mover 8 coupled to collet 5 and a driver 9 rotated by a drive tool 11. Driver 9 is positioned to engage collet mover 8 so that collet mover 8 draws collet 5 axially inward in response to rotation of drive tool 11 in one direction to grip machine tool 6 and pushes collet 5 axially outward in response to rotation of the drive tool 11 in an opposite direction to release machine tool 6 so that machine tool 6 can be released and replaced without removing tool holder 1 from spindle 13.

Conical shank 2 is configured to be mount in a spindle 13 (in phantom) of a machining center and tool holder-change flange 3 is configured to be gripped by an automated tool holder changer (not shown) to facilitate the removal of tool holder 1 from spindle 13 and insertion of another tool holder (not shown) into spindle 13 by the tool holder changer. Tool holder 1 may be rigidly or otherwise mounted to other machining devices such as, for example, drills, drill presses, or CNC machines.

Collet actuator 7 is accessible to an operator while tool holder 1 is mounted on spindle 13 to permit an operator to change machine tool 6 without removing tool holder 1 from spindle 13. Body 4 is formed to include a collet chamber configured to receive collet 5, an actuator chamber 17 including a collet-mover chamber 19 configured to receive collet mover 8, and a passageway 29 configured to receive driver 9. Body 4 further includes an exterior surface 23 including an edge 35 defining an access aperture 27 positioned axially outward of spindle 13 and tool holder-change flange 3. By positioning access aperture 27 outside of spindle 13, an operator may insert drive tool 11 into the interior region of body 4 to engage and operate collet actuator 7 so that collet 5 may be moved relative to body 4 to grip or release machine tool 6 without removing tool holder 1 from spindle 13.

Referring to FIG. 2, a tool holder 10 includes a collet 20, a depth-adjustment screw 30, a collet mover 40, a driver 50, and a body 60. Collet mover 40 is mounted for rotation in a collet-mover chamber 61 formed in body 60 using a snap ring 70 that fits into an annular channel 62 formed in body 60. Collet 20 includes a body 21 and a threaded post 22 that is configured to mate in threaded engagement with a threaded aperture 41 formed in collet mover 40 when collet 20 is mounted in a collet chamber 63 formed in body 60 as shown, for example, in FIG. 3. Collet 20 is arranged to move relative to body 60 back and forth along central axis 44 in response to rotation of collet mover 40 about axis 44.

Depth-adjustment screw 30 is mounted for rotation in a threaded aperture 23 formed in post 22 of collet 20 to enable an operator to rotate screw 30 using a screw rotator tool during machine set-up to set the operating depth of a machine tool 6 (shown in FIG. 3a) extending into a tool-receiving chamber 24 formed in collet 20 and retained in tool holder 10. Depth-adjustment screw 30 includes an inner end 31 that lies in tool-receiving chamber 24 and engages a tool (not shown) received therein and an outer end 32 configured to be coupled to the screw rotator tool (not shown). Threads 33 on depth-adjustment screw 30 threadedly engage the threads provided in aperture 23 formed in post 22 of collet 20.

Collet mover 40 is a worm gear and driver 50 is a worm having a helical drive thread 51 that threadedly engages an exterior gear-teeth thread 42 formed on an outer surface 43 of collet mover 40. Body 60 is formed to include a passageway 64 arranged to communicate with collet-mover chamber 61 so that driver 50 can be rotated about central axis 52 to cause collet mover 40 to rotate in collet-mover chamber 61 about axis of rotation 44.

Body 60 further includes an exterior surface 75 having a edge 77 defining an access aperture 79 opening into passageway 64. Driver 50 includes an exposed head 53 that is accessible through access aperture 79 into passageway 64 in body 60 so that an operator can engage a drive tool 54 to head 53 and operate the tool (e.g., allen wrench) to rotate driver 50 in passageway 64 about central axis 52. Driver 50 is mounted for rotation in passageway 64 formed in body 60 using a snap ring (not shown) that fits into an annular channel (not shown) formed in body 60 and arranged to communicate with passageway 64 (see snap ring 80 and annular channel 165 for guidance in FIGS. 5–7).

As shown in FIG. 3a, a shank 91 of machine tool 6 is first inserted into the tool-receiving chamber 24 formed in collet 20 while the tool-gripping surface(s) 25 of collet 20 are "relaxed" and not wedged radially inwardly to grip shank 91 of tool 6. Rotation of driver 50 about central axis 53 in a first direction rotates collet mover 40 about axis of rotation 44 and, due to threaded engagement of threaded post 22 of collet 20 and threaded aperture 41 of collet mover 40, creates a draw on collet 20 so that collet 20 is actuated and moved from left to right relative to body 60 in FIG. 3. As the collet 20 moves to the right, a "wedging action" causes the tool-gripping surface(s) 25 to move radially inwardly to grip shank 91 of tool 6 very tightly so that tool 6 is retained in tool holder 10.

Rotation of driver 50 about central axis 53 in an opposite second direction causes collet mover 40 to push collet 20 from right to left relative to body 60 in FIG. 3 so as to "release" shank 91 of tool 6 from the tight grip of collet 20 so that machine tool 6 can be removed from tool holder 10. Snap ring 70 retains collet mover 40 in position in collet-mover chamber 61 has a bearing surface 71 that serves as the thrust-bearing base to pull against while collet mover 40 draws collet 20 further into body 60. Body 60 includes an integral bearing wall 81 positioned on the opposite side of collet mover 40 from snap ring 70 that has a bearing surface 73 that servers as thrust-bearing base to support collet mover 40 as collet 20 is pushed axially outward from body 60.

Referring to FIG. 5, a tool holder 100 includes a collet 20, a depth adjustment screw 30, a collet mover 140, a driver 150, and a body 160. Collet mover 140 is mounted for rotation in a collet-mover chamber 61 formed in body 160 using a snap ring 70 that fits into an annular channel 62 formed in body 160. Collet 20 includes a body 21 and a threaded post 22 that is configured to mate in threaded engagement with a threaded aperture 41 formed in collet mover 140 when collet 20 is mounted in a collet chamber 63 formed in body 160 as shown, for example, in FIG. 6.

Depth-adjustment screw 30 is mounted for rotation in a threaded aperture 23 formed in collet 20 to enable an operator to rotate screw 30 using a tool (not shown) during machine tool setup to set the operating depth of a tool (not shown) extending into a tool-receiving chamber 24 formed in collet 20 and retained in tool holder 10. Collet 20 also includes tool-gripping surface(s) 25 in tool-receiving chamber 24.

Collet mover 140 is a driven bevel gear and driver 150 is a drive bevel gear having a tapered gear-teeth thread 151 that threadedly engages an exterior tapered gear-teeth thread 142 formed on an outer surface 143 of collet mover 140. Body 160 is formed to include a passageway 164 arranged to communicate with collet-mover chamber 161 so that driver 150 can be rotated about central axis 152 to cause collet mover 140 to rotate in collet-mover chamber 161 about axis of rotation 44. Body 160 further includes an exterior surface 175 having a edge 177 defining an access aperture 179 opening into passageway 164. Driver 150 includes an exposed head 153 that is accessible through access aperture 179 into passageway 164 in body 160 so that an operator can engage a drive tool 154 to head 153 and operate the tool (e.g., allen wrench) to rotate driver 150 in passageway 164 about central axis 152. Driver 150 is mounted for rotation in passageway 164 formed in body 160 using a snap ring 80 that fits into an annular channel 165 formed in body 160.

Shank 91 of tool 6 shown in FIG. 3a can be gripped by collet 20 in the manner shown in FIG. 3a by using drive tool 154 to rotate driver 150 which, in turn, rotates collet mover 140. Rotation of driver 150 about central axis 153 in a first direction rotates collet mover 140 about axis of rotation 44 and, due to threaded engagement of threaded post 22 of collet 20 and threaded aperture 141 of collet mover 140, creates a draw on collet 20 so that collet 20 is actuated and moved from left to right relative to body 160 in FIG. 6. Rotation of driver 150 about central axis 153 in an opposite second direction causes collet 20 to move from right to left relative to body 160 in FIG. 6 so as to release shank 91 of tool 6 from the tight grasp of collet 20.

Snap ring 70 retains collet mover 140 in position in collet-mover chamber 161 and serves as the thrust-bearing base to pull against while collet mover 140 draws collet 20 further into body 160. Body 160 includes an integral bearing wall 181 positioned on the opposite side of collet mover 140 from snap ring 70 that has a thrust surface 183 that servers as thrust-bearing base to support collet mover 140 as collet 20 is pushed axially outward from body 160.

Referring to FIG. 8, a tool holder 200 includes a collet 220, a collet mover 240 including first and second wedges 241, 242, a driver 250, and a body 260. Collet 220 includes a body 221, a base 222, and a shank 223 coupled to body 221 and base 222 and arranged to define first and second wedge-receiving spaces 224, 225 therebetween. Shank 223 is formed to include an aperture 226 for receiving driver 250 therein and allowing rotation of driver 250 about an axis of rotation 251. Collet 20 further includes a tool-receiving chamber 234 and tool-gripping surface(s) 235 in tool-receiving chamber 234. Compression springs 236 (see FIG. 8) are arranged to act against base 222 and against body 260 as shown, for example, in FIG. 9a.

Collet base 222 is sized to fit into a base chamber 266 formed in body 260 as shown in FIGS. 8 and 9a and collet body 221 is sized to fit into a collet chamber 267 formed in body 260. Collet shank 223 passes through a wedge-receiving chamber 261 formed in body 260 to expose the openings into aperture 226 to open regions of wedge-receiving chamber 261.

Wedges 241, 242 cooperate to define collet mover 240 and are mounted for reciprocating movement in a wedge-receiving chamber 261 formed in body 260. Wedge 241 includes an aperture 243 having a right-hand thread 244 and wedge 242 includes an aperture 245 having a left-hand thread 246 therein. Wedge 241 includes a first cam follower 246 engaging a first drive cam 262 formed on body 260 and arranged to face into wedge-receiving chamber 261 and a second cam follower 247 engaging a first release cam 263 formed on body 260 and arranged to face into wedge-receiving chamber 261. Wedge 242 includes a first cam follower 248 engaging a second drive cam 264 formed on body 260 and arranged to face into wedge-receiving chamber 261 and a second cam follower 249 engaging a second release cam 265 formed on body 260 and arranged to face into wedge-receiving chamber 261.

Driver 250 is a differential screw having a right-hand thread 253 on one end 252 and a left-hand thread 254 on an opposite end 255. When driver 250 is rotated about axis 251 in one direction, it causes equal spreading of wedges 241, 242 apart and when driver 250 is rotated about axis 251 in the opposite direction it brings wedges 241, 242 closer together equally.

Body 260 further includes an exterior surface 275 having a edge 277 defining an access aperture 279 opening into passageway 264. Driver 250 includes an exposed head 256 that is accessible through access aperture 279 into a passageway 264 formed in body 260 so that an operator can engage a tool (not shown) to head 256 and operate the tool (e.g., allen wrench) to rotate driver in passageway 264 about central axis 251. Passageway 264 includes one reach 268 having an outer opening formed in an exterior surface of body 260 and an inner opening communicating with wedge-receiving chamber 261 and another reach 269 having an outer opening formed in an exterior surface of body 260 and an inner opening communicating with wedge-receiving chamber 261 as shown, for example, in FIG. 8.

Collet 220 is positioned initially in a tool-releasing position as shown in FIG. 9a to enable an operator to insert the shank of a tool easily into tool-receiving chamber 234 of collet 220. Wedges 241, 242 of collet mover 240 are positioned by driver 250 to lie in close but spaced-apart relation from one another in radially inward positions as shown, for example, in FIG. 9b.

Shank 91 of tool 6 is gripped by collet 220 as shown in FIG. 10a by rotating driver 250 about axis 251 in a first direction to move wedges 241, 242 away from one another in wedge-receiving chamber 261 to create a draw on collet 220 so that collet 220 is actuated and moved from left to right relative to body 260 as shown in FIG. 10a. First cam follower 246 on wedge 241 rides on first drive cam 262 on body 260 and first cam follower 248 on wedge 242 rides on second drive cam 264 on body 260 to cause collet 220 to move to the right. As the collet 220 moves to the right, a wedging action causes the tool-gripping surface(s) 235 to move radially inwardly to grip shank 91 of tool 6 very tightly.

Shank 91 of tool 6 is released by collet 220 by rotating driver 250 about axis 251 in an opposite, second direction to move wedges 241, 242 toward one another in wedge-receiving chamber 261. Second cam follower 247 on wedge 241 rides on first release cam 263 on body 260 and second cam follower 249 on wedge 242 rides on second release cam 265 on body 260 to cause collet 220 to move relative to body 260 back to the left to reach its initial position shown in FIG. 8. As the collet 220 moves to the left, a releasing action causes the tool-gripping surface(s) 235 to move radially outwardly to release shank 91 of tool 6.

Figure 19:
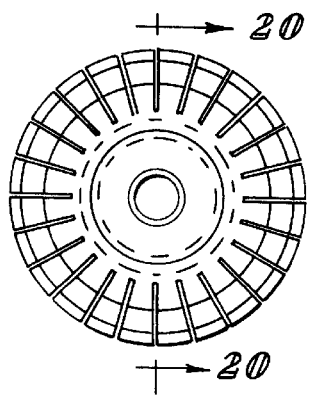
FIG. 19 is an end view of a fifth embodiment of a collet that is suitable for use in the tool holder of FIGS. 2 and 5.
Figure 20:
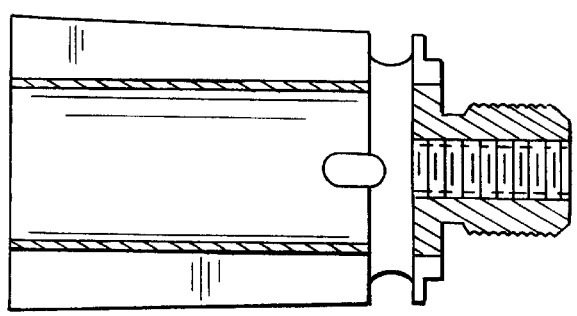
FIG. 20 is a sectional view of the tool holder taken along line 20—20 of FIG. 19.

Five collets suitable for use in a tool holder such as the ones shown in FIGS. 2 and 5 are illustrated in FIGS. 11–20. The collet shown in FIGS. 11 and 12 has no splits in it and is configured to "collapse" slightly in a controlled manner to grip a tool received therein in response to compressive forces generated by collet mover 40 and driver 50 or collet mover 140 and driver 150. The collet shown in FIGS. 13 and 14 has a single split therein as shown best in FIG. 13. The collet shown in FIGS. 15 and 16 has multiple splits therein. The collet shown in FIGS. 17 and 18 includes two split lines 308 that go all the way to the depth of the I.D. bore, clean through all the segments and a scalloped relief 309 to allow the segment 310 to wrap around a tool received in the collet without interference. The collet shown in FIGS. 19 and 20 is the same as the collet shown in FIGS. 17 and 18 except there is no split that extends to the I.D. bore. The body of these collets are capable of being used in tool holder 200 by coupling said bodies to shank 223 of collet 220.

Although the invention has been disclosed in detail with reference to certain preferred embodiments, variations and modifications exist within the scope and spirit of the invention as recited in the following claims.

What is claimed is:

1. A tool holder comprising
a body formed to include a collet chamber,
a collet including a collet body and a threaded post, the collet body including a body-engaging surface arranged to engage the body and a tool-gripping surface arranged to define a tool-receiving chamber adapted to receive a machine tool therein, the collet being mounted for movement in the collet chamber along a central axis of the body between a tool-grip position to cause the tool-gripping surface to move radially inwardly toward the central axis to grip the machine tool in the tool-receiving chamber and a tool-release position to cause the tool-gripping surface to move radially outwardly away from the central axis to release the machine tool, the body also being formed to include a mover chamber arranged to communicate with the collet chamber, the collet body being formed to include a notch,
a collet mover positioned to lie in the mover chamber and coupled to the threaded post of the collet to draw the collet axially inwardly along the central axis to the tool-grip position in response to rotation of the collet mover about an axis of rotation in the mover chamber and push the collet axially outwardly along the central axis to the tool-release position in response to rotation of the collet mover about the axis of rotation in the mover chamber and a retainer ring extending circumferentially around the collet and being coupled to the body so that the retainer ring is fixed against movement relative to the body, the retainer ring being configured to contact the collet mover to prohibit axially outward movement of the collet mover relative to the central axis when the collet mover draws the collet axially inwardly relative to the central axis to the tool-grip position, the retainer ring being configured to fit within the notch formed in the collet body.

2. The tool holder of claim 1, wherein the body includes an exterior surface formed to include an access aperture and a passageway arranged to interconnect the access aperture and the collet-mover chamber and further comprising a driver positioned to lie in the passageway and engage the collet mover and arranged to move in the passageway to rotate the collet mover about the axis of rotation.

3. The tool holder of claim 2, further comprising a drive tool including a drive portion arranged to pass through the access aperture and engage the driver in the passageway and a handle portion arranged to lie outside the passageway to be gripped by an operator to enable the operator to move the driver in the passageway to rotate the collet mover about the axis of rotation.

4. The tool holder of claim 3, wherein the collet mover includes gear teeth arranged to face toward the passageway during rotation of the collet mover in the collet-mover chamber and the driver includes a drive thread that engages the gear teeth of the collet mover and an exposed head positioned to lie in the passageway and engaged to the drive portion of the drive tool to cause the collet mover to rotate about the axis of rotation in response to rotation of the driver in the passageway during rotation of the drive portion of the drive tool in the passageway.

5. The tool holder of claim 2, wherein the collet mover includes gear teeth arranged to face toward the passageway during rotation of the collet mover in the collet-mover chamber and the driver includes a drive thread that engages the gear teeth of the collet mover to cause the collet mover to rotate about the axis of rotation in response to rotation of the driver in the passageway.

6. The tool holder of claim 5, wherein the driver is a worm, the drive thread is a helical thread, and the gear teeth engage the helical thread of the worm.

7. The tool holder of claim 6, wherein the passageway is oriented to lie in perpendicular relation to the axis of rotation of the collet mover and the worm is oriented in the passageway to rotate about an axis of rotation that lies in intersecting, perpendicular relation to the axis of rotation of the collet mover.

8. The tool holder of claim 5, wherein the driver is a bevel gear, the drive thread is defined by tapered gear teeth on the bevel gear, and the gear teeth of the collet mover are tapered to engage the tapered gear teeth on the bevel gear.

9. The tool holder of claim 8, wherein the passageway is oriented to lie at an acute angle in relation to the axis of rotation of the collet mover and the bevel gear is oriented in the passageway to rotate about an axis of rotation that lies in non-parallel, intersecting relation to the axis of rotation of the collet mover.

10. The tool holder of claim 1, wherein the body is also formed to include an annular channel opening into the collet chamber, a snap ring is positioned to lie in the annular channel and arranged to engage the collet mover to retain the collet mover in position in the collet-mover chamber during rotation of the collet mover about the axis of rotation.

11. The tool holder of claim 10, wherein the collet further includes a body and a threaded post coupled to one end of the body, the collet mover is formed to include a threaded aperture receiving the threaded post therein, and the collet is arranged to move in the collet chamber toward the collet mover to the tool-grip position in response to rotation of the collet mover about the axis of rotation due to threaded engagement of the threaded post of the collet and the threaded aperture of the collet mover using a portion of the snap ring in engagement with the collet mover as a thrust base.

12. The tool holder of claim 11, wherein the threaded post is formed to include a threaded aperture extending therethrough and further comprising a depth-adjustment screw mounted for rotation in the threaded aperture formed in the threaded post, the depth-adjustment screw including an outer end arranged to lie in the tool-receiving chamber and adapted to be engaged by the machine tool mounted in the tool-receiving chamber and an inner end adapted to be coupled to a screw-rotator tool.

13. The tool holder of claim 1, further comprising means for rotating the collet mover about the axis of rotation in a first direction to create the draw on the collet and move the collet in the collet chamber toward the collet mover to cause the tool-gripping surface of the collet to move radially inwardly toward the central axis.

14. The tool holder of claim 13, wherein the rotating means includes means for establishing a thrust-bearing arranged to engage the collet mover during rotation of the collet mover about the axis of rotation.

15. The tool holder of claim 13, wherein the establishing means includes a snap ring coupled to the body.

16. The tool holder of claim 13, wherein the establishing means includes a first bearing surface and a second bearing surface spaced apart from the first bearing surface and the collet mover is positioned to lie between the first and second bearing surfaces.

17. The tool holder of claim 13, wherein the rotating means includes a worm arranged to engage helical threads formed on an exterior surface of the collet mover.

18. The tool holder of claim 17, wherein the body is formed to include a passageway and an access aperture opening into the passageway and the worm is mounted for rotation in the passageway.

19. The tool holder of claim 17, wherein the body is formed to include a passageway and an access aperture opening into the passageway and the worm is mounted for rotation in the passageway and the rotating means further includes a drive tool including a drive portion arranged to pass through the access aperture and engage the worm in the passageway and a handle portion arranged to lie outside the passageway to be gripped by an operator to enable the operator to move the worm in the passageway to rotate the collet mover about the axis of rotation.

20. The tool holder of claim 13, wherein the rotating means includes a bevel gear arranged to engage a set of tapered teeth formed on an exterior surface of the collet mover.

21. A tool holder comprising
a body formed to include a collet chamber,
a collet including a tool-gripping surface arranged to define a tool-receiving chamber adapted to receive a machine tool therein, the collet being mounted for movement in the collet chamber along a central axis of the body between a tool-grip position to cause the tool-gripping surface to move radially inwardly toward the central axis to grip the machine tool in the tool-receiving chamber and a tool-release position to cause the tool-gripping surface to move radially outwardly away from the central axis to release the machine tool, the body also being formed to include a collet-mover chamber arranged to communicate with the collet chamber, and
a collet mover positioned to lie in the collet-mover chamber and coupled to the collet to draw the collet along the central axis to the tool-grip position in response to sliding of the collet mover in the collet-mover chamber relative to the body and the collet mover including first and second wedges mounted to move axially along the central axis and away from one another to draw the collet to the tool-grip position, each of the first and second wedges contacting the body at axially spaced locations.

22. The tool holder of claim 21, further comprising a driver, wherein the driver is a differential screw having a right-hand thread on one end and a left-hand thread on an opposite end, the collet mover includes first and second wedges mounted to move toward and away from one another in the collet-mover chamber, the first wedge is coupled to the right-hand thread on one end of the differential screw, and the second wedge is coupled to the left-hand thread on the opposite end of the differential screw to cause the first and second wedges to move apart in response to rotation of the differential screw in the passageway in one direction and to move toward one another in response to rotation of the differential screw in the passageway in an opposite direction.

23. The tool holder of claim 22, wherein the body is formed to include cam surfaces and the first and second wedges are positioned to ramp axially inwardly against the cam surfaces during movement of the wedges apart from one another.

24. The tool holder of claim 22, further comprising a spring positioned to lie between the collet and the body to bias the collet to the tool-release position.

25. The tool holder of claim 22, wherein the collet includes a body positioned to engage the body of the tool holder and a shank coupled to the body of the collet and the driver is positioned to lie in the shank.

26. The tool holder of claim 25, wherein the collet further includes a base coupled to the shank and the wedges are positioned to lie between the base and the body of the collet to slide toward the shank in response to the driver rotating in one direction and away from the shank in response to the driver rotating in another direction.

27. The tool holder of claim 21, wherein the body includes an exterior surface having an edge defining an access aperture and a passageway arranged to interconnect the access aperture and the collet-mover chamber.

28. The tool holder of claim 27, further comprising a driver positioned to lie in the passageway and engage the collet mover and arranged to move in the passageway to slide the collet mover relative to the body.

29. A tool holder used to grip a machine tool, the tool holder comprising a body formed to include a collet chamber, a collet-mover chamber, a passageway in communication with the collet-mover chamber, and an exterior surface having an edge defining an access aperture opening into the passageway, a collet positioned in the collet chamber and formed to include a tool-receiving chamber, the collet including a tool-gripping surface adapted to grip a machine tool positioned in the tool-receiving chamber, the collet including an end face, a collet mover positioned in the collet-mover chamber to engage the collet, the collet mover including a first end face, a second end face spaced axially apart and facing axially away from the first end face relative to an axis of the bode an outer surface, and an inner surface, the first end face being configured to face and approach the end face of the collet the second end face being configured to engage the body the inner surface being configured to engage the collet and rotate relative to the collet, and a driver positioned in the passageway of the body to engage the collet mover to move the collet relative to the body along the axis to cause the tool-gripping surface of the collet to engage the machine tool, the driver being accessible to an operator through the access aperture.

30. The tool bolder of claim 29, further comprising a conical shank, wherein the conical shank includes an axially inner end and an axially outer end and a tool holder-change flange coupled to the axially outer end of the conical shank.

31. The tool holder of claim 30, wherein the edge defining the access aperture is positioned axially outward of the conical shank.

32. The tool holder of claim 31, wherein the edge defining the access aperture is positioned axially outward of the tool holder-change flange.

33. The tool holder of claim 29, wherein the collet includes a body and a threaded portion and the collet mover includes a body and a threaded portion positioned to engage the threaded portion of the collet to move the collet axially during rotation of the collet mover.

34. The tool holder of claim 29, wherein the body has a central axis and the passageway has a central axis that is nonparallel to the central axis of the body.

35. The tool holder of claim 34, wherein the central axis of the passageway is orthogonal to the central axis of the body.

36. The tool holder of claim 34, wherein the central axis of the passageway is at about a 45 degree angle relative to the central axis of the body.

37. The tool bolder of claim 29, wherein the collet chamber has a central axis and the collet-mover chamber has a central axis that is co-linear with the central axis of the collet chamber.

38. The tool holder of claim 29, further comprising a thrust-bearing positioned to support the collet mover relative to the collet during movement of the collet relative to the body.

39. The tool holder of claim 38, wherein the body is formed to include an annular channel opening into the collet chamber and the thrust-bearing is a snap ring positioned to lie in the annular channel to retain the collet mover in the collet-mover chamber.

40. The tool holder of claim 38, wherein the body includes an axially inner end and an axially outer end and the thrust-bearing is positioned to lie between the collet mover and axially inner end of the body.

41. The tool holder of claim 40, wherein the thrust-bearing is integral with the body.

42. The tool holder of claim 38, wherein the body includes an axially inner end and an axially outer end, the thrust-bearing is positioned to lie between the collet mover and the axially inner end of the body, and further comprising another thrust-bearing positioned to lie between the collet mover and the axially outer end of the body that supports the collet mover relative to the collet during movement of the collet relative to the body.

43. The tool holder of claim 29, further comprising a depth-adjustment screw, wherein the collet includes female threads and an axially outer end, the depth-adjustment screw engages the female threads of the collet to provide the tool-receiving chamber with an adjustable depth measured from the axially outer end of the collet to the depth-adjustment screw.

44. The tool holder of claim 29, wherein the driver is a worm and the collet mover is a worm gear.

45. The tool holder of claim 29, wherein the driver is a drive bevel gear and the collet mover is a driven bevel gear.

46. The tool holder of claim 29, wherein the driver is a differential screw and the collet mover includes a pair of wedges.

47. The tool holder of claim 29, wherein the driver includes an exposed head that is accessible through the access aperture and adapted to be rotated by a drive tool to rotate the driver and move the collet relative to the body in response to the rotation of the driver.

48. A tool holder configured for mounting in a spindle of a machining center, the tool holder comprising a body formed to include a collet chamber, and an actuator chamber, a collet positioned in the collet chamber and formed to include a tool-receiving chamber, the collet including a tool-gripping surface adapted to grip the machine tool positioned to lie in the tool-receiving chamber, the tool-gripping surface including a first end and a second end spaced axially apart from the first end relative to a central axis of the collet, the collet including an externally circumferentially extending relief notch and an internally circumferentially extending relief notch to allow a portion of the collet to grip the machine tool without interference with another portion of the collet, the internally and externally circumferentially extending relief notches being positioned to lie in coaxial and coextensive relation to one another at the first end of the tool-gripping surface, and a collet actuator positioned in the actuator chamber to engage and move the collet relative to the body to move the tool-gripping surface of the collet into engagement with the machine tool, the body further including an exterior surface positioned to lie outside of the spindle while the tool holder is mounted on the machining center, the exterior surface including an edge defining an access aperture providing access to the collet actuator while the tool holder is mounted on the machining center so that an operator may activate the collet actuator to move the collet relative to the body while the tool holder remains mounted to the machining center.

49. The tool holder of claim 48, further comprising a tool holder-change flange coupled to the body and a conical shank coupled to the tool-holder change flange and the edge defining the access aperture is positioned axially outward of the tool holder-change flange.

50. The tool holder of claim 48, wherein the collet actuator includes an exposed head that is accessible through the access aperture and adapted to be rotated by a drive tool.

51. The tool holder of claim 48, wherein the body further includes an axially inner end and an axially outer end and the edge defining the access aperture is spaced apart from the axially inner end of the body.

52. A tool holder used to grip a machine tool, the tool holder comprising a drive tool, a body formed to include a collet chamber having a central axis, a collet positioned to lie in the collet chamber and formed to include a tool-receiving chamber, the collet including a tool-gripping surface adapted to grip a machine tool positioned in the tool-receiving chamber, the collet including a collet body having an end and means for converting rotation of the drive tool about an axis other than the central axis of the collet into axial movement of the collet relative to the body to move the tool-gripping surface of the collet into engagement with the machine tool, the converting means being positioned to lie in the body.

53. The tool holder of claim 52, wherein the converting means includes a worm and a worm gear positioned to engage the worm.

54. The tool holder of claim 52, wherein the converting means includes a driven bevel gear and a drive bevel gear positioned to engage the driven bevel gear.

55. The tool holder of claim 52, wherein the converting means includes a pair of wedges and a differential screw positioned to engage the pair of wedges.

56. The tool holder of claim 21, wherein the body includes cam surfaces, the first wedge includes first and second cam followers spaced axially apart from one another, the second wedge includes first and second cam followers spaced axially apart from one another, and the first and second cam followers of the first and second wedges are positioned to ramp axially inwardly against the respective cam surfaces of the body during movement of the first and second wedges apart from one another to draw the collet to the tool-grip position.

* * * * *